Aug. 16, 1932. J. A. BALL 1,871,649
THREE-COLOR CINEMATOGRAPHIC CAMERA
Filed June 7, 1929
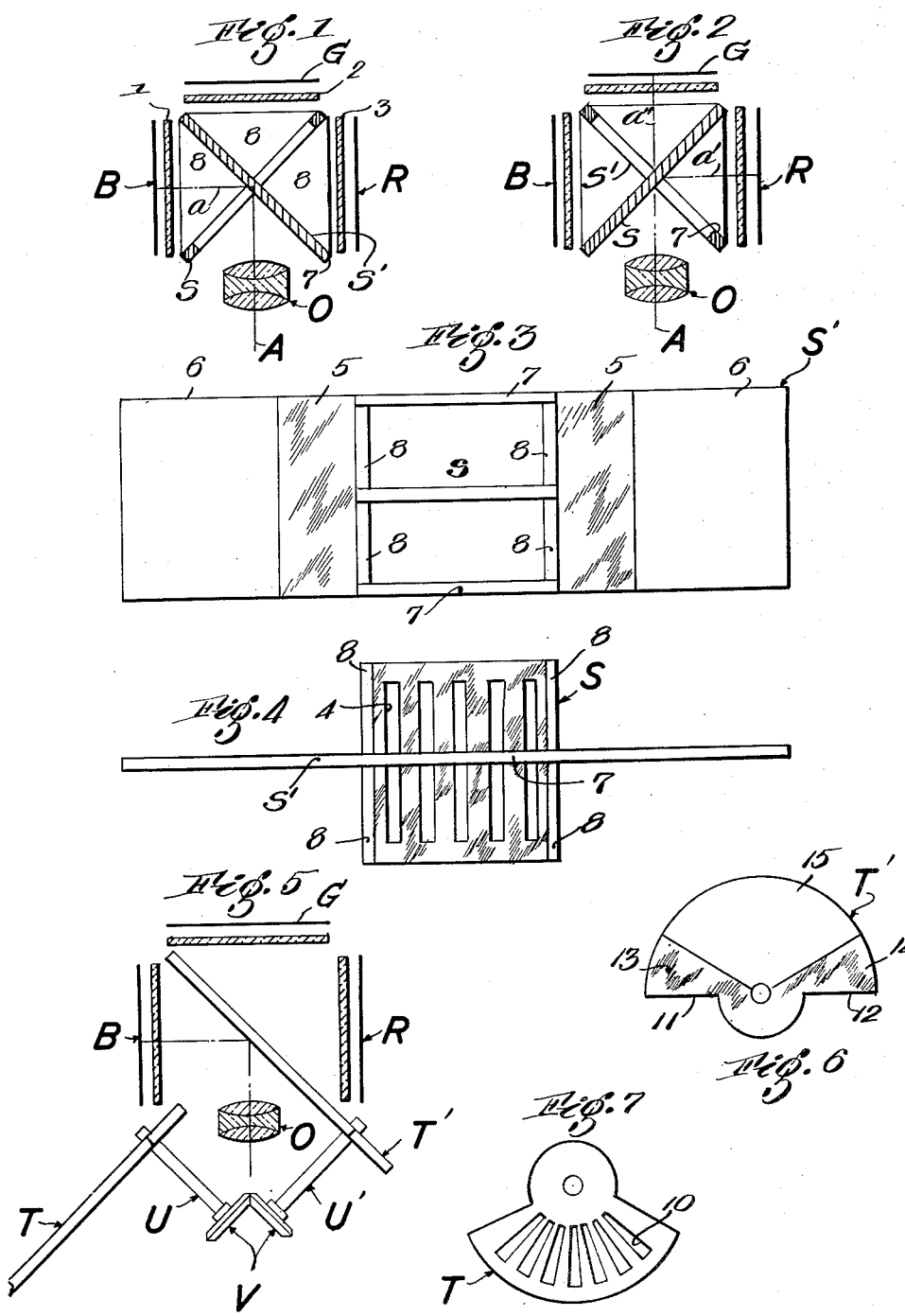

Patented Aug. 16, 1932

1,871,649

UNITED STATES PATENT OFFICE

JOSEPH A. BALL, OF LOS ANGELES, CALIFORNIA, ASSIGNOR, BY MESNE ASSIGNMENTS, TO TECHNICOLOR, INC., OF NEW YORK, N. Y., A CORPORATION OF DELAWARE

THREE-COLOR CINEMATOGRAPHIC CAMERA

Application filed June 7, 1929. Serial No. 369,073.

This invention relates to photographic cameras and particularly to cinematographic cameras for concomitantly making three or more series of complemental records representing different color aspects of the object-field on the same strip or different strips of film through the same lens, with the objects of making the records of each complemental set register accurately when superposed, minimizing the distance between the camera lens and the focal planes, thereby permitting the use of lenses having relatively great depth of focus at larger apertures, utilizing all of the available light except during the minimum time intervals required for the intermittent advancement of the film, thereby to increase the degree of exposure for a given camera speed, and generally improving the art of three-color cinematography.

In one aspect the invention involves reflecting shutters recurrently movable across the optical axis, either by reciprocation or by rotation, to deflect successive portions of the light to film on different sides of the optical axis. The shutters may be interconnected to move together as a unitary device, or they may be relatively movable and merely operate in synchronism. While they may be disposed in various angular relationships they are preferably disposed in planes which intersect each other at approximately right-angles and intersect the optical axis at approximately forty-five degrees, in which case two of the focal planes are parallel to each other while the third is perpendicular to the two. The shutter means is constructed to transmit a part of the light either between the two shutters or through one or more openings in one or both shutters or both.

For the purpose of illustrating the genus of the invention two embodiments are shown diagrammatically in the accompanying drawings, in which Figs. 1 and 2 are sectional views of an embodiment using reciprocating shutters, showing the shutters in different positions in the two figures respectively;

Figs. 3 and 4 are side views of the shutters viewed from directions at right-angles to each other;

Fig. 5 is a view similar to Figs. 1 and 2 showing a modification using revolving shutters; and Figs. 6 and 7 are elevational views of the two shutters.

In the embodiment shown in Figs. 1 to 4 inclusive R, G and B represent three cinematographic films which feed along paths perpendicular to the paper and upon which the red, green and blue records are to be formed respectively, 1, 2 and 3 representing filters for transmitting the desired components of light to the respective films; O represents the objective lens; and S and S' the two shutters above referred to which are reciprocated in a direction perpendicular to the paper by any suitable means (not shown). The shutter S comprises a reflecting surface on the side next to the objective O and is provided with slots 4 extending transversely of the path of reciprocation so that when this shutter crosses the optical axis A, a part of the light is reflected to the film R and a part is transmitted to the film G. The shutter S' comprises two similar sections disposed on opposite sides of the shutter S in a plane perpendicular to the plane of the shutter S, each section comprising a reflecting portion 5 and a non-reflecting portion 6. The two shutters are rigidly interconnected as a unitary device by means of two longitudinal bars 7 and three pairs of transverse webs 8, the webs being omitted from the quadrant facing the objective so that the objective may be located more closely to the shutters.

In operation the shutters S—S' reciprocate back and forth between positions in which the non-reflecting portions 6 are approximately centered on the optical axis A, in which extreme positions light is prevented from reaching any of the films owing to the fact that these surfaces are non-reflecting. As the shutters reciprocate from one extreme position to the other, one of the reflecting surfaces 5 first crosses the optical axis to reflect light to the film B along the branch path a, as shown in Fig. 1; then the shutter S crosses the light path to reflect a part of the light to the film R along the branch path a' and concomitantly to transmit a part of the light to the film G in the branch path a" which constitutes a continuation of the main path A; the other reflector 5 next crosses the optical axis to reflect more light to the film B; and the other non-reflecting portion 6 then obstructs all of the light to all of the films. Thus it will be understood that each exposure of the film B is effected partly by one of the reflectors 5 and partly by the other reflector 5; also that the films are intermittently advanced at each end of the reciprocation of the shutters while one of the non-reflecting portions 6 extends across the light path.

The modification shown in Figs. 5, 6 and 7 is similar in principle but differs in that the two shutters T and T' are separately movable and revolve instead of reciprocate. Each shutter comprises a segment of a circle and is mounted on one of the two shafts U and U' which may be interconnected to be driven in synchronism in any suitable manner, as for example by the bevel gears V. The shutter T, corresponding to S of Figs. 1 to 4, is reflecting and is provided with slots 10 to transmit a part of the light to the film G while reflecting a part to the film R. The shutter T' corresponding to S' of the preceding figures, is partly reflecting and partly non-reflecting. The reflecting and non-reflecting portions of the shutter T' may be proportioned and positioned in various ways, as for example by making the portion adjacent one edge 11 reflecting and the portion adjacent the other edge 12 non-reflecting, but as shown in Fig. 6 the reflecting surface is divided into two portions 13 and 14 located adjacent the edges 11 and 12 with the non-reflecting portion 15 intermediate the divided reflecting surfaces.

As shown in Fig. 5 the mechanical interconnection between the two shutters T and T' is such that the two shutters intermesh, that is they cross the light path in succession in intersecting planes, one shutter crossing the light path in the cutaway part of the other shutter while the latter shutter is on the side of its axis opposite the light path. In other words as the trailing edge of one shutter leaves the light path the leading edge of the other shutter follows closely therebehind. However the two shutters are preferably timed so as not to touch each other, in which case some light is transmitted between the shutters to the film G, the width of the slots 10 being correlated with the spacing between the shutters so that the total amount of light reaching the film G through all of the spaces will be properly proportioned to the light reflected to film R by the reflecting portion of shutter T and to the light reaching film B from the reflecting portions 13 and 14 of the shutter T'. Obviously the proportion of light which should reach each of the three films depends upon a number of factors such as the character of the filters 1, 2, 3 and the character of the films, etc., so that the proportions illustrated in the drawings are merely illustrative.

While the two shutters T and T' may be driven from the outside instead of the inside, the driving connections are simplified by interconnecting the shutters on the inside as illustrated in Fig. 5, in which case the plane containing the axes of the two shafts U and U' should of course be offset from the optical axis of the objective O either at an angle to the optical axis or parallel thereto, preferably the latter, so that the light path is not obstructed by the mechanism for driving the shutters in synchronism.

While the red, green and blue records may be exposed respectively at any of the three locations, the arrangement shown in the drawings has the very important advantage of simultaneously forming the red and green records, which contribute chiefly to definition, so that only the blue record, which contributes much less definition, is even slightly out of time phase with the other two of each complemental set. Thus when the three records are superposed the color fringing of the blue record is not noticeable.

By dividing the partial reflector into a considerable number of alternate reflecting and non-reflecting portions the color fringing about moving objects is not noticeable for the reason that the time phase difference between successive exposures is thereby reduced to a negligible degree. While the minimum number of such portions depends upon the angular velocity of moving objects in the scene, for average conditions five to ten pairs of reflecting and non-reflecting portions are sufficient.

While the preferred embodiments have a non-reflecting portion on one of the reflecting shutters to cut off all light while the films are simultaneously advanced it will of course be understood that this non-reflecting portion may be dispensed with by providing auxiliary shutters or by advancing the R and S films while light is deflected to the B film and then advancing the B film during exposure of the R and G films.

I claim:

1. A camera for making three color records of an object-field comprising an objective lens for focusing a beam of light, means including two reflecting portions successively movable across the optical axis behind the objective lens for reflecting recurrent portions of the beam to different sides of the optical axis to form two color records, one of said reflecting portions transmitting a part of the beam to form a third color record in the optical axis concomitantly with one of said first two records, and one of said portions having an opaque surface of sufficient extent to obstruct light from certain of the films during intermittent advancement thereof.

2. A camera for concomitantly making three series of cinematographic records respectively representing different color aspects of the object-field comprising an objective lens and means having two reflectors recurrently movable across the optical axis, one of the reflectors deflecting light to film on one side of the optical axis and concomitantly transmitting light to film in the optical axis, the other reflector deflecting light to film on another side of the optical axis and having an opaque non-reflecting portion for shuttering all the films during intermittent advancement thereof.

3. A camera for concomitantly making three series of cinematographic records respectively representing different color aspects of the object-field comprising an objective lens and means having two reflecting portions recurrently movable across the optical axis, one of the reflecting portions deflecting light to film on one side of the optical axis and concomitantly transmitting light to film in the optical axis, the other reflecting portion deflecting light to film on another side of the optical axis, said reflecting portions being disposed in planes approximately perpendicular to each other, and one of said portions having an opaque non-reflecting surface for shuttering all the films during intermittent advancement thereof.

4. A camera for concomitantly making plural series of cinematographic records comprising two shafts angularly related to each other and to the optical axis, means for rotating the shafts in synchronism, and segmental shutters mounted on the shafts in intermeshing relationship so that they cross the optical axis alternately, the shutters having reflecting portions for deflecting parts of the light to film on different sides of the optical axis, one of the shutters transmitting a part of the light to film in the optical axis, and one of the shutters having an opaque portion of sufficient extent to obstruct light from certain of the films during intermittent advancement thereof.

Signed by me at New York, New York, this 31st day of May, 1929.

JOSEPH A. BALL.